US 10,935,458 B2

(12) United States Patent
Hayashi et al.

(10) Patent No.: US 10,935,458 B2
(45) Date of Patent: Mar. 2, 2021

(54) FACILITY CONDITION MONITORING DEVICE AND FACILITY CONDITION MONITORING METHOD

(71) Applicant: MITSUBISHI HEAVY INDUSTRIES, LTD., Tokyo (JP)

(72) Inventors: Kentaro Hayashi, Tokyo (JP); Takahiro Nakano, Tokyo (JP); Atsushi Yuge, Tokyo (JP); Masaaki Shibata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 402 days.

(21) Appl. No.: 15/935,775

(22) Filed: Mar. 26, 2018

(65) Prior Publication Data
US 2019/0226943 A1 Jul. 25, 2019

(30) Foreign Application Priority Data
Jan. 23, 2018 (JP) .............................. JP2018-008792

(51) Int. Cl.
*G01M 13/028* (2019.01)
*G01M 13/045* (2019.01)
(Continued)

(52) U.S. Cl.
CPC ........... *G01M 13/028* (2013.01); *F03D 17/00* (2016.05); *G01M 13/045* (2013.01);
(Continued)

(58) Field of Classification Search
None
See application file for complete search history.

(56) References Cited

U.S. PATENT DOCUMENTS 9,458,835 B2 * 10/2016 Ikeda ...................... F03D 17/00
2012/0290879 A1 11/2012 Shibuya et al.
2014/0195184 A1 7/2014 Maeda et al.

FOREIGN PATENT DOCUMENTS

JP H04-188307 A 7/1992
JP 2003-315205 A 11/2003
(Continued)

OTHER PUBLICATIONS

Sheng ("Wind Turbine Gearbox Condition Monitoring Round Robin Study—Vibration Analysis", NREL, Task No. WE11.0305, Jul. 2012). (Year: 2012).*
(Continued)

*Primary Examiner* — Roy Y Yi
(74) *Attorney, Agent, or Firm* — Manabu Kanesaka; Kenneth Berner; Benjamin Hauptman (57) ABSTRACT

A facility condition monitoring device includes an abnormality-degree-calculation-model construction part which constructs an abnormality-degree-calculation model for calculating an abnormality degree of a monitoring feature group of a monitoring target facility, based on a normal feature group extracted from a state-quantity fluctuation data of the monitoring target facility, an abnormality degree calculation part which calculates the abnormality degree of the monitoring feature group with the abnormality-degree-calculation model, an abnormality determination part which determines whether the monitoring target facility is abnormal, based on the abnormality degree, an abnormality-contribution-rate calculation part which obtains a contribution rate of each feature constituting the monitoring feature group used for calculating the abnormality degree determined as abnormal by the abnormality determination part, and an abnormality cause identification part which identifies an abnormality cause of the monitoring target facility, based on the contribution rate and a cause-and-effect matrix representing a relationship between the abnormality cause and the features.

7 Claims, 6 Drawing Sheets

| | Technique 1 | | | Technique 2 | | | | | | Technique 3 | | | ... |
|---|---|---|---|---|---|---|---|---|---|---|---|---|---|
| | F₁ | F₂ | F₃ | F₄ | F₅ | F₆ | F₇ | F₈ | F₉ | F₁₀ | F₁₁ | F₁₂ | F₁₃ | ... |
| A | YYY | Y | NN | YYY | Y | N | | N | N | Y | N | N | N | ... |
| B | YYY | Y | NN | YY | YY | N | | N | N | Y | N | N | N | ... |
| C | YY | YY | NN | | Y | YY | YY | N | N | Y | N | N | N | ... |
| D | YY | Y | NN | YY | Y | N | | N | Y | Y | N | N | N | ... |
| E | Y | Y | NN | | Y | YY | Y | | N | Y | N | N | N | ... |
| F | | YY | YYY | N | N | N | N | N | N | | YYY | N | N | ... |
| G | | YY | YYY | N | N | N | N | N | N | Y | N | YYY | N | ... |
| H | | YY | YYY | N | N | N | N | N | N | Y | N | N | YYY | ... |
| I | NN | | YYY | N | | N | N | N | N | | Y | Y | Y | ... |
| J | Y | YY | | | | N | | YY | N | | N | N | N | ... |
| K | YY | YY | N | Y | Y | N | YY | YY | N | Y | N | N | N | ... |
| ... | ... | ... | ... | ... | ... | ... | ... | ... | ... | ... | ... | ... | ... | ... |

Abnormality cause (failure mode)

(51) Int. Cl.
*F03D 17/00* (2016.01)
*G05B 23/02* (2006.01)

(52) U.S. Cl.
CPC ....... *G05B 23/024* (2013.01); *G05B 23/0281* (2013.01); *F05B 2220/706* (2013.01); *F05B 2260/80* (2013.01)

(56) References Cited

FOREIGN PATENT DOCUMENTS

| JP | 2009-054843 A | 3/2009 |
| JP | 2013-041448 A | 2/2013 |
| JP | 2013-199804 A | 10/2013 |
| JP | 2015-172945 A | 10/2015 |
| JP | 2016-023489 A | 2/2016 |
| JP | 2017-089590 A | 5/2017 |
| JP | 6361175 B2 * | 7/2018 |

OTHER PUBLICATIONS https://www.six-sigma-material.com/Correlation-Matrix.html.*
http://linear.ups.edu/html/section-LC.html.*
Japan Patent Office, "Office Action for Japanese Patent Application No. 2018-008792," dated Nov. 19, 2019.
Japan Patent Office, "Office Action for Japanese Patent Application No. 2018-008792," dated Jul. 9, 2019.

* cited by examiner

| Abnormality cause (failure mode) | Technique 1 ||| Technique 2 ||||||  Technique 3 |||| ... |
| --- | --- | --- | --- | --- | --- | --- | --- | --- | --- | --- | --- | --- | --- | --- |
|  | $F_1$ | $F_2$ | $F_3$ | $F_4$ | $F_5$ | $F_6$ | $F_7$ | $F_8$ | $F_9$ | $F_{10}$ | $F_{11}$ | $F_{12}$ | $F_{13}$ | ... |
| A | YYY | Y | NN | YYY | Y | N |  | N | N | Y | N | N | N | ... |
| B | YYY | Y | NN | YY | YY | N |  | N | N | Y | N | N | N | ... |
| C | YY | YY | NN |  | Y | YY | YY | N | N | Y | N | N | N | ... |
| D | YY | Y | NN | YY | Y | N |  | N | Y | Y | N | N | N | ... |
| E | Y | Y | NN |  | Y | YY | Y |  | N | Y | N | N | N | ... |
| F |  | YY | YYY | N | N | N | N | N | N |  | YYY | N | N | ... |
| G |  | YY | YYY | N | N | N | N | N | N | Y | N | YYY | N | ... |
| H |  | YY | YYY | N | N | N | N | N | N | Y | N | N | YYY | ... |
| I | NN |  | YYY | N | N | N | N | N | N |  | Y | Y | Y | ... |
| J | Y | YY |  |  |  | N |  | YY | N |  | N | N | N | ... |
| K | YY | YY | N | Y | Y | N | YY | YY | N | Y | N | N | N | ... |
| ... | ... | ... | ... | ... | ... | ... | ... | ... | ... | ... | ... | ... | ... | ... |

FIG. 6

| Abnormality cause | Possibility |
|---|---|
| A | ▫ |
| B | ▨ |
| C | ▨ |
| D | ▨▨ |
| E | ▨▨▨ |
| F | ▫ |
| G | ▨ |
| H | ▫ |
| I | ▫ |
| J | |
| K | ▨ |

FIG. 7

FACILITY CONDITION MONITORING DEVICE AND FACILITY CONDITION MONITORING METHOD

RELATED APPLICATIONS

The present application is based on, and claims priority from, Japanese Application No. JP2018-008792 filed Jan. 23, 2018, the disclosure of which is hereby incorporated by reference herein in its entirety.

TECHNICAL FIELD

The present disclosure relates to condition monitoring for a facility (apparatus) including a rotating machine or a reciprocating machine.

BACKGROUND ART

As a condition monitoring device for a wind turbine power generating apparatus, for instance, a condition monitoring system (CMS) is known. CMS collects and analyzes measurement data such as vibration of a gear, a bearing, or the like measured with a vibration sensor and rotational speed measured with a revolution indicator mounted to a generator shaft to monitor the health of main components of the wind turbine power generating apparatus, based on the analysis results. However, a recent wind turbine power generating apparatus tends to have a larger structure with an increase in output power of the wind turbine power generating apparatus, and the data amount acquired by CMS or the like increases accordingly, which may lead to an increased risk of the oversight of abnormalities during the analysis of measurement data, as well as a problem of taking a longer time to identify the cause of abnormalities.

For instance, Patent Document 1 discloses a method of evaluating the health of a diagnosis target from multivariate data using the Mahalanobis-Taguchi method (hereinafter, referred to as the MT method), and a health diagnosis apparatus for a wind turbine in which the above method is applied to a wind turbine. The MT method is a monitoring technique which allows one to relatively easily monitor the condition of a monitoring target facility even with a number of state quantities to be monitored. In this method, a normal group is defined as a unit space based on multivariate data, and a distance (Mahalanobis distance) from the unit space to target data is measured to determine an abnormality. In this way, it is possible to comprehensively diagnose the monitoring target facility only with a single index, namely, the Mahalanobis distance.

Non-Patent Document 1 discloses an abnormality detection system for a wind turbine power generating apparatus. This abnormality detection system extracts features from normal-state data (past data) and constructs a normal-state model with an unsupervised machine learning algorithm in learning phase. Examples of the features include time-domain features such as root mean square value (RMS), kurtosis, skewness, crest factor, difference between maximum and minimum peaks, clearance factor, and impulse indicator; and frequency-domain features such as statistic based on envelope analysis (e.g. root mean square envelope) and Fourier local auto-correlation features (FLAC), corresponding to a damage pattern in each machine element. These features are integrated to construct a feature vector of vibration data for each time point. Then, abnormality detection target data is processed for identification to calculate the deviance from the normal-state model and is thresholded to determine whether normal or abnormal.

On the other hand, Patent Document 2 discloses that, in order to diagnose an abnormality of a rotating machine such as a power generating turbine or a generator, signs of an abnormal phenomenon of the rotating machine are detected from the tendency of vibration amplitude value, amplitude increase rate, frequency components, phase shift or the like, and the cause of vibration (for instance, scattering of a part of a rotating unit) is extracted (identified) using the detected information and a vibration cause-and-effect matrix. This vibration cause-and-effect matrix shows a relationship between factors in vibration (row) and items regarding dominant frequency (column).

CITATION LIST

Patent Literature

Patent Document 1: JP2016-125947A
Patent Document 2: JP3708041B

Non-Patent Literature

Non-Patent Document 1: Jun Ogata, et al. "*Development of Condition Monitoring System Based on Vibration Data Analysis for Wind Turbine Smart Maintenance*", Japan Wind Energy Association, Vol. 37 (2015), p. 385-388

SUMMARY

However, Non-Patent Document 1 fails to disclose a method for identifying an abnormality cause when an abnormality is determined. Further, although Patent Document 1 discloses that the vibration cause is identified with a vibration cause-and-effect matrix, using the information obtained by detecting signs of an abnormal phenomenon and the vibration cause-and-effect matrix which shows a relationship between vibration factors and dominant frequency, it fails to disclose a specific technique which teaches how to identify the abnormality cause using the above information.

In view of the above circumstances, an object of at least one embodiment of the present invention is to provide a facility condition monitoring device that identifies the cause of a detected abnormality based on an abnormality degree determined from multivariate data.

(1) A facility condition monitoring device according to at least one embodiment of the present invention is for diagnosing an abnormality of a monitoring target facility including a rotating machine or a reciprocating machine, based on state-quantity fluctuation data representative of a time-dependent change of a state quantity measured on the monitoring target facility, the facility condition monitoring device comprising: an abnormality-degree-calculation-model construction part configured to construct an abnormality degree calculation model for calculating an abnormality degree of a monitoring feature group consisting of a plurality of features extracted from the state-quantity fluctuation data of the monitoring target facility in a monitoring state, based on a normal feature group consisting of a plurality of features extracted from the state-quantity fluctuation data of the monitoring target facility in a normal state; an abnormality degree calculation part configured to calculate the abnormality degree of the monitoring feature group with the abnormality degree calculation model; an abnormality determination part configured to determine whether an abnormality is present in the monitoring target facility, based on the abnormality degree; an abnormality-contribution-rate calculation part configured to obtain a contribution rate of each of the plurality of features constituting the monitoring feature group used for calculating the abnormality degree if it is determined by the abnormality determination part that an abnormality is present; and an abnormality cause identification part configured to identify an abnormality cause of the monitoring target facility, based on the contribution rate and a cause-and-effect matrix which represents a relationship between the abnormality cause and the plurality of features.

With the above configuration (1), an abnormality (abnormality sign) of the monitoring target facility is determined based on the abnormality degree calculated based on the abnormality degree calculation model constructed based on the normal feature group (multivariate data). Furthermore, using the cause-and-effect matrix which represents a relationship between the abnormality cause of the monitoring target facility and the contribution rate of each of the features with respect to the abnormality degree, the cause of an abnormality occurring in the monitoring target facility is identified based on the contribution rates of the features, with respect to the abnormality degree, constituting the monitoring feature group used for calculating the abnormality degree if it is determined that an abnormality is present. In this way, the cause-and-effect matrix is made with a relationship between the abnormality cause and the contribution rate of the features with respect to the abnormality degree, and the abnormality cause is identified, using this cause-and-effect matrix, based on the contribution rate of each of the features with respect to the abnormality degree when an abnormality is determined, which makes it possible to precisely identify the abnormality cause.

(2) In some embodiments, in the above configuration (1), the plurality of features comprise technique-specific features extracted by adopting a plurality of different techniques to the state quantity fluctuation data.

With the above configuration (2), the features are extracted by respectively adopting a plurality of techniques to the state-quantity fluctuation data, and thereby it is possible to multilaterally monitor an abnormality of the monitoring target facility.

(3) In some embodiments, in the above configuration (1) or (2), the facility condition monitoring device further comprises a state-quantity-fluctuation-data acquisition part configured to acquire the state-quantity fluctuation data; and a feature extraction part configured to extract the plurality of features from the state-quantity fluctuation data.

With the above configuration (3), the facility condition monitoring device has function parts for extracting a plurality of features from the acquired state-quantity fluctuation data. For instance, the construction of the abnormality degree calculation model and the abnormality monitoring can be performed in real time by connecting the state-quantity-fluctuation-data acquisition part with a sensor disposed in the monitoring target facility.

(4) In some embodiments, in any one of the above configurations (1) to (3), the state-quantity fluctuation data comprises a time-dependent change of the state quantity in a transient period during which a rotational speed of the monitoring target facility is changed from a first value to a second value.

In a case where the monitoring target facility is a wind turbine, for instance, the rotational speed is changed from 0 (first value) to a rated speed (second value) at the start up time. Under an operation condition in such a transient period, some abnormal phenomenon is likely detected, unlike in a steady operation period where the rotational speed is kept at the second value. Accordingly, with the above configuration (4), the abnormality diagnosis can be performed based on the state-quantity fluctuation data in the operation transient period such as the start up time of the monitoring target facility, and thereby it is possible to more reliably detect an abnormality caused in the monitoring target facility.

(5) In some embodiments, in any one of the above configurations (1) to (4), the plurality of features comprise features extracted by a band-pass filter which automatically extracts an impulse waveform from a skewness of a time-frequency spectrum.

The state-quantity fluctuation data in a transient period, during which the state quantity transiently varies, takes a time for processing to extract the features and requires time sequential information.

The above configuration (5) enables a diagnosis taking the time change in consideration by an evaluation using data with time information such as FLAC and SFI filter.

(6) In some embodiments, in any one of the above configurations (1) to (5), the state quantity is a vibration of the monitoring target facility, a strain, a torque during a rotational movement or a reciprocating movement, a rotational speed, or when the monitoring target facility is a power generating apparatus, a voltage or a current.

With the above configuration (6), it is possible to appropriately monitor an abnormality of the monitoring target facility, based on the time-dependent change of these state quantities.

(7) In some embodiments, in any one of the above configurations (1) to (6), the monitoring target facility is a wind turbine power generating apparatus.

With the above configuration (7), it is possible to monitor the condition of the wind turbine power generating apparatus (wind turbine).

(8) A facility condition monitoring method according to at least one embodiment of the present invention is for diagnosing an abnormality of a monitoring target facility including a rotating machine or a reciprocating machine, based on state-quantity fluctuation data representative of a time-dependent change of a state quantity measured on the monitoring target facility, the facility condition monitoring method comprising: an abnormality-degree-calculation-model construction step of constructing an abnormality degree calculation model for calculating an abnormality degree of a monitoring feature group consisting of a plurality of features extracted from the state-quantity fluctuation data of the monitoring target facility in a monitoring state, based on a normal feature group consisting of a plurality of features extracted from the state-quantity fluctuation data of the monitoring target facility in a normal state; an abnormality degree calculation step of calculating the abnormality degree of the monitoring feature group with the abnormality degree calculation model; an abnormality determination step of determining whether an abnormality is present in the monitoring target facility, based on the abnormality degree; an abnormality-contribution-rate calculation step of obtaining a contribution rate of each of the plurality of features constituting the monitoring feature group used for calculating the abnormality degree if it is determined in the abnormality determination step that an abnormality is present; and an abnormality cause identification step of identifying an abnormality cause of the monitoring target facility, based on the contribution rate and a cause-and-effect matrix which represents a relationship between the abnormality cause and the plurality of features.

With the above configuration (8), the same effect is achieved as in the above (1).

(9) In some embodiments, in the above configuration (8), the plurality of features comprise technique-specific features extracted by adopting a plurality of different techniques to the state quantity fluctuation data.

With the above configuration (9), the same effect is achieved as in the above (2).

(10) In some embodiments, in the above configuration (8) or (9), the facility condition monitoring method further comprises a state-quantity-fluctuation-data acquisition step of acquiring the state-quantity fluctuation data; and a feature extraction step of extracting the plurality of features from the state-quantity fluctuation data.

With the above configuration (10), the same effect is achieved as in the above (3).

(11) In some embodiments, in any one of the above configurations (8) to (10), the state-quantity fluctuation data comprises a time-dependent change of the state quantity in a transient period during which a rotational speed of the monitoring target facility is changed from a first value to a second value.

With the above configuration (11), the same effect is achieved as in the above (4).

(12) In some embodiments, in any one of the above configurations (8) to (11), the plurality of features comprise features extracted by a band-pass filter which automatically extracts an impulse waveform from a skewness of a time-frequency spectrum.

With the above configuration (12), the same effect is achieved as in the above (5).

(13) In some embodiments, in any one of the above configurations (8) to (12), the state quantity is a vibration of the monitoring target facility, a strain, a torque during a rotational movement or a reciprocating movement, a rotational speed, or when the monitoring target facility is a power generating apparatus, a voltage or a current.

With the above configuration (13), the same effect is achieved as in the above (6).

(14) In some embodiments, in any one of the above configurations (8) to (13), the monitoring target facility is a wind turbine power generating apparatus.

With the above configuration (14), the same effect is achieved as in the above (7).

According to at least one embodiment of the present invention, there is provided a facility condition monitoring device that identifies the cause of a detected abnormality based on an abnormality degree determined from multivariate data.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
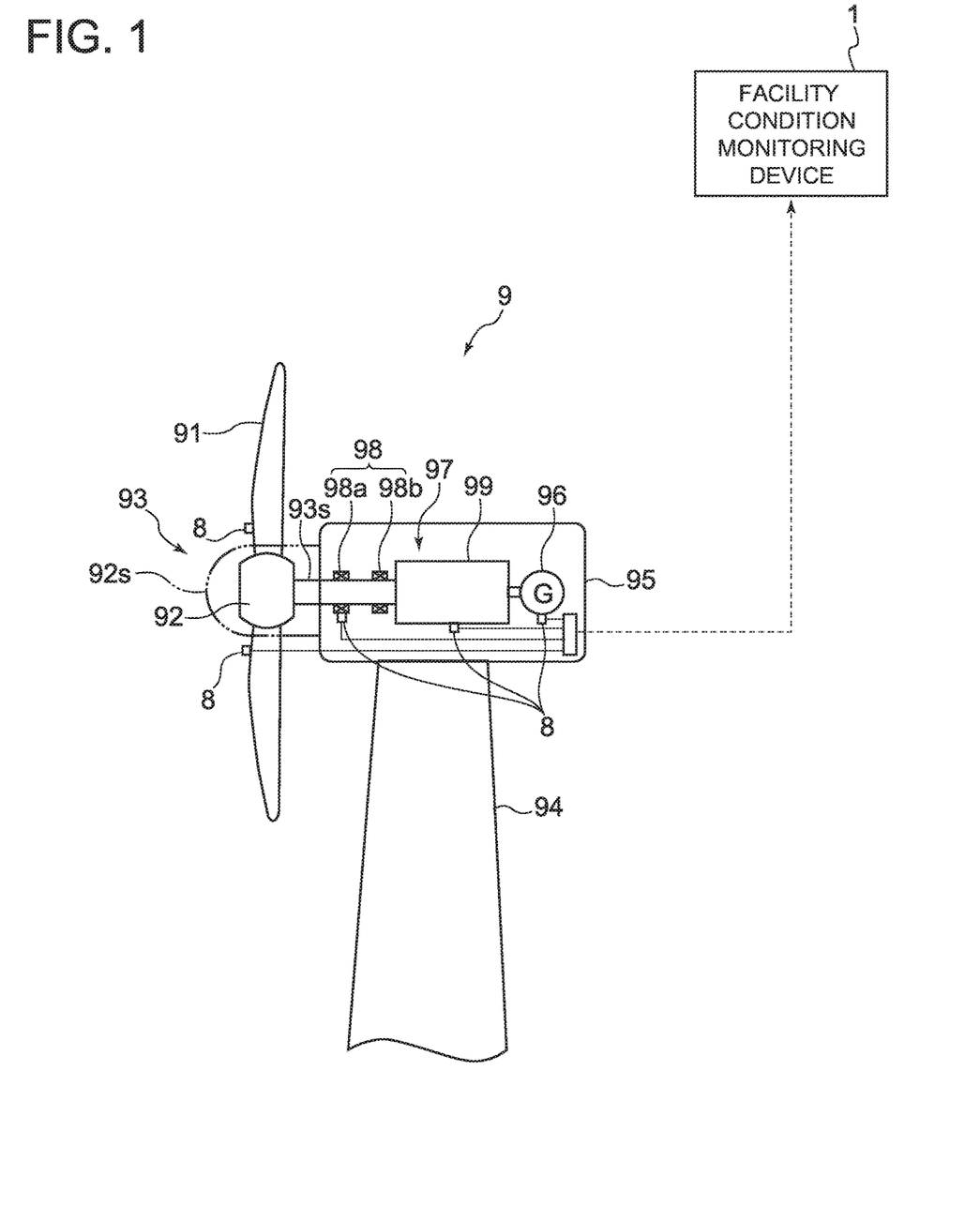
FIG. 1 is a diagram showing a facility condition monitoring device for diagnosing an abnormality of a wind turbine power generating apparatus according to an embodiment of the present invention.

FIG. 1 is a diagram showing a facility condition monitoring device 1 for diagnosing an abnormality of a wind turbine power generating apparatus according to an embodiment of the present invention. The facility condition monitoring device 1 is adapted to diagnose an abnormality of a monitoring target facility 9 including a rotating machine or a reciprocating machine, based on state-quantity fluctuation data D representative of a time-dependent change of a state quantity measured on the monitoring target facility 9. The monitoring target facility 9 is a facility (apparatus) such as, for instance, a wind turbine power generating apparatus (wind turbine) (see FIG. 1) or an engine (not shown) having a piston reciprocably disposed within a cylinder. The state-quantity fluctuation data D contains a set of sensor values (measurement data) obtained by multiple measurement in a certain period with sensors 8 disposed in the monitoring target facility 9. The state-quantity fluctuation data D may be constructed such that the time course of the measurement data can be discriminated by, for instance, associating the individual measurement data with time data such as measurement time or time sequence.

In the embodiment shown in FIG. 1, the monitoring target facility 9 is a wind turbine power generating apparatus. As shown in FIG. 1, the wind turbine power generating apparatus includes a wind turbine rotor 93 provided with one or more (in FIG. 1, a plurality of) wind turbine blades 91 and a hub 92 with the wind turbine blades 91 mounted thereto. The wind turbine rotor 93 is provided on a top of a tower 94 disposed on a water or ground surface and is rotatably supported to a nacelle 95 supported to the tower 94. The wind turbine rotor 93 including the wind turbine blades 91 rotates as the wind turbine blades 91 receive wind. The nacelle 95 accommodates a generator 96 and a drive train 97 (power transmission mechanism) for transmitting rotation of the wind turbine rotor 93 to the generator 96 and is configured such that rotation energy transmitted to the generator via the drive train 97 from the wind turbine rotor 93 is converted into electric energy by the generator 96. In addition, the wind turbine power generating apparatus may include a pitch device or a yaw device (not shown). The wind turbine power generating apparatus is mainly composed of the above components.

As shown in FIG. 1, the drive train 97 may include a main shaft 93s connected to the wind turbine rotor 93, main bearings 98 (98a, 98b) rotatably supporting the main shaft 93s, and a transmission 99 for transmitting rotation of the wind turbine rotor 93 with a changed speed to the generator. In this case, the transmission 99 may be a hydraulic transmission including a hydraulic pump and a hydraulic motor, or may be a gear box configured to output rotation of the main shaft 93s with an increased speed to the generator 96. Alternatively, it may be a direct drive transmission configured such that the generator 96 is directly driven by rotation of the main shaft 93s without the drive train 97. The hub 92 may be covered with a hub cover 92s.

Additionally, as shown in FIG. 1, to measure a desired state quantity of the wind turbine power generating apparatus (monitoring target facility 9), sensors 8 are provided on appropriate positions, such as main components of the monitoring target facility 9 (e.g. the wind turbine blades 91, the main bearing or the gear box of the drive train, or the generator), in accordance with a state quantity to be measured. That is, one or more state quantities are measured by providing one or more sensors 8 for a single monitoring target facility 9. Examples of such state quantities include vibration and strain at the wind turbine blades 91 and the drive train 97, oil temperature (in a case of a hydraulic drive train), current and voltage of the generator 96, rotational speed and torque of a shaft of the drive train or the wind turbine rotor 93 (main shaft). These state quantities usually vary over time.

In the embodiment shown in FIG. 1, the measurement data measured with the sensor 8 is communicated (transmitted) from the wind turbine power generating apparatus side to the facility condition monitoring device 1, for instance, via a communication network. This enables the facility condition monitoring device 1 to acquire the state-quantity fluctuation data D in real time. In this regard, the measurement data may be transmitted to the facility condition monitoring device 1 alone or together with data such as measurement time of the measurement data. Additionally, the communication may be performed to transmit the measurement data to the facility condition monitoring device 1 or the like as often as a measurement value is acquired by the sensor 8. Alternatively, the communication may be performed when a plurality of measurement data are obtained, for instance, periodically or once a predetermined number or more of measurement data are obtained. The communication network may include the Internet and may be built with wired and/or wireless connection. However, the present invention is not limited to the present embodiment. In some embodiments, the facility condition monitoring device 1 may be configured, without being connected to the monitoring target facility 9, such that the state-quantity fluctuation data D is acquired from other system (apparatus), such as CMS or SCADA, which remotely monitors the monitoring target facility 9.

The facility condition monitoring device 1 is configured to perform diagnosis of abnormality of the monitoring target facility 9 (detection of abnormality and identification of abnormality cause), based on the state-quantity fluctuation data D containing the measurement data obtained from at least one sensor 8 disposed in the monitoring target facility 9 as described above.

Figure 2:
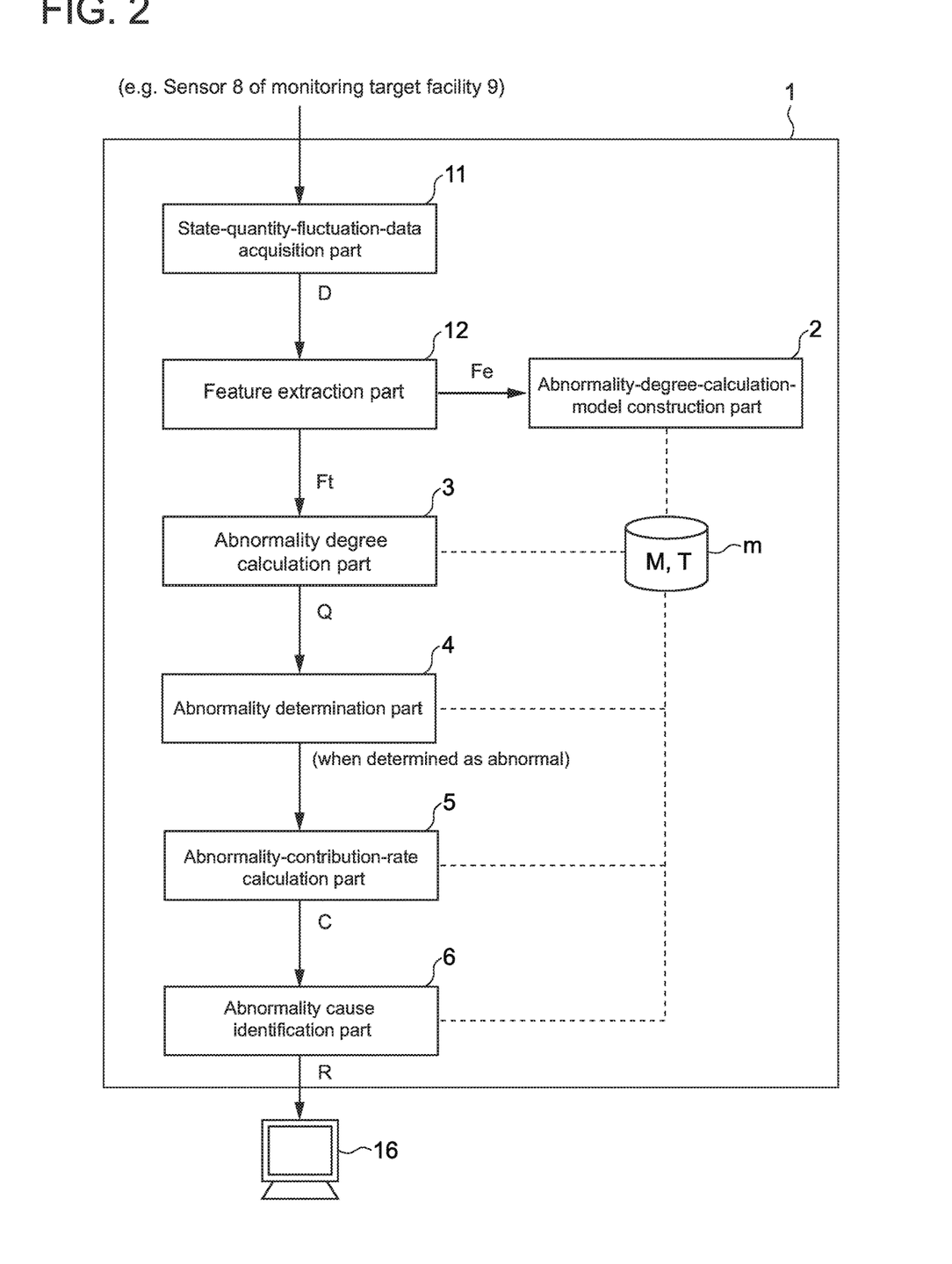
FIG. 2 is a schematic configuration diagram of a facility condition monitoring device according to an embodiment of the present invention.
Figure 3:
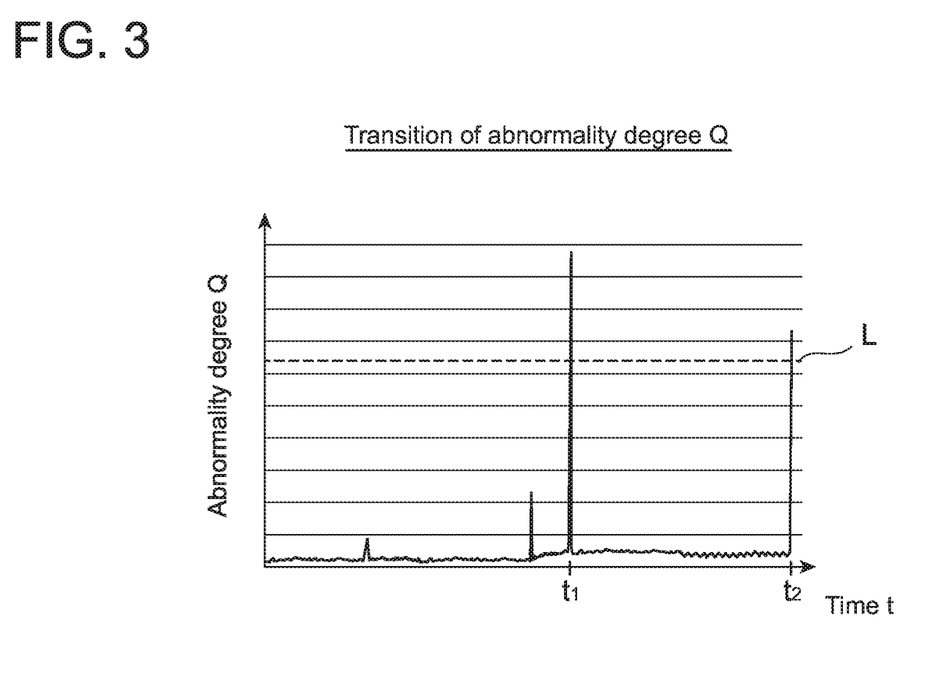
FIG. 3 is a diagram of an exemplary time course of an abnormality degree according to an embodiment of the present invention.
Figure 4:
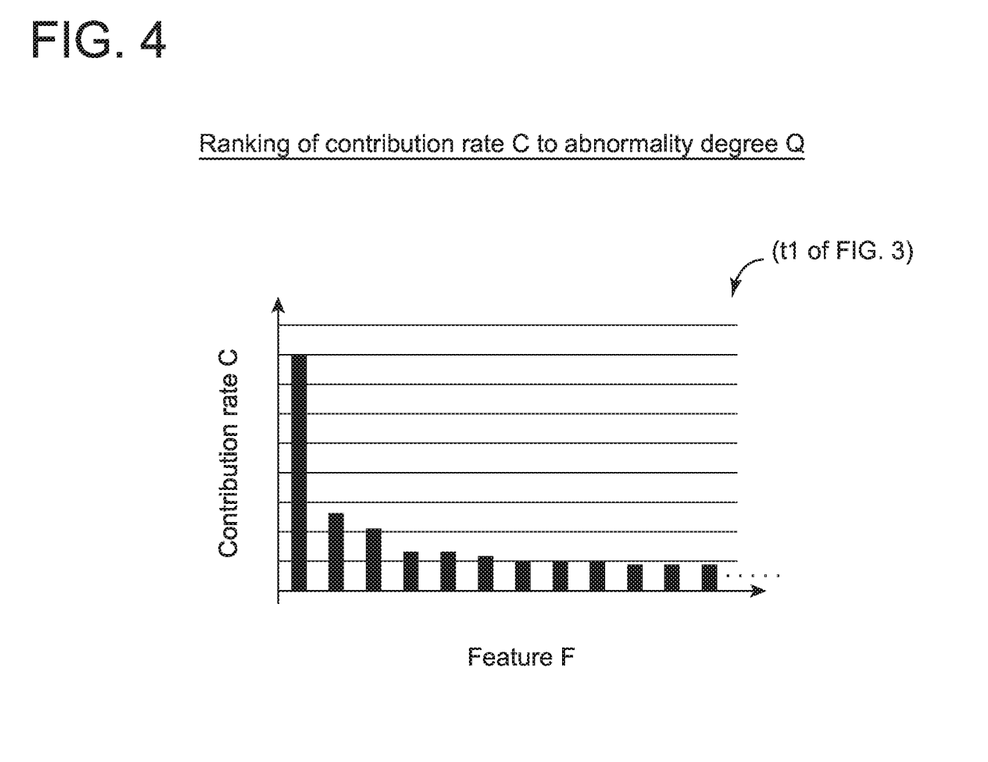
FIG. 4 is a diagram showing a ranking of contribution rates of features to an abnormality degree according to an embodiment of the present invention.
Figure 5:
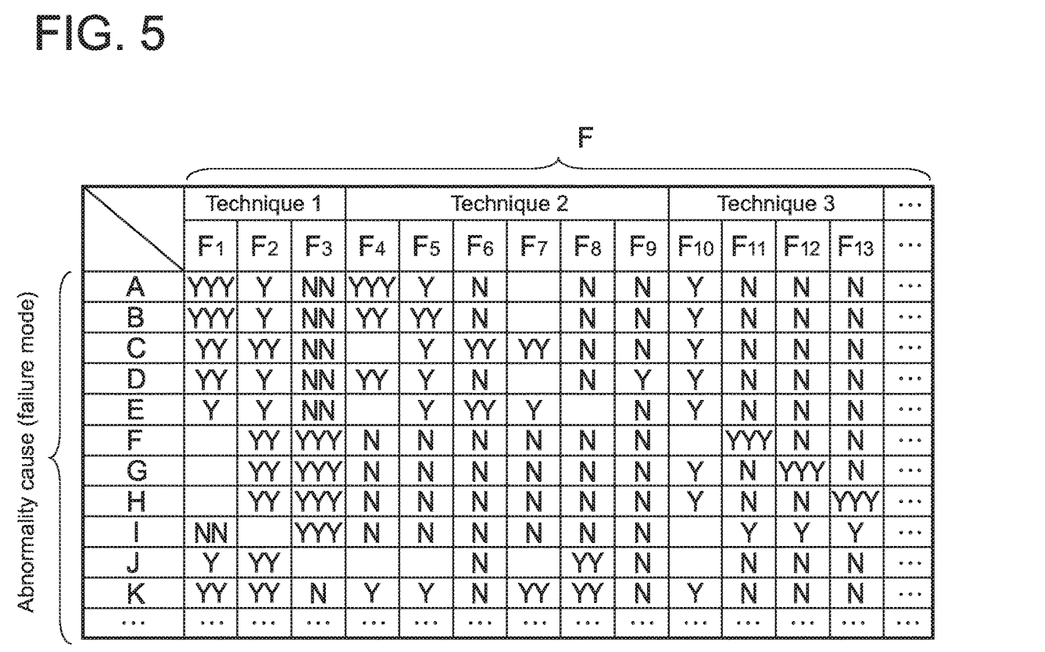
FIG. 5 is a diagram of an exemplary cause-and-effect matrix according to an embodiment of the present invention.
Figure 6:
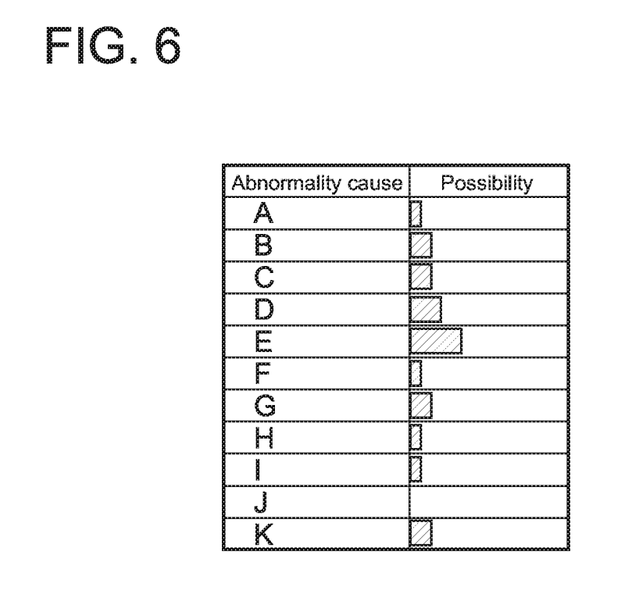
FIG. 6 is a diagram of an exemplary identification result of an abnormality cause according to an embodiment of the present invention.

The facility condition monitoring device 1 will now be described with reference to FIGS. 2 to 6. FIG. 2 is a schematic configuration diagram of a facility condition monitoring device 1 according to an embodiment of the present invention. FIG. 3 is a diagram of an exemplary time course of an abnormality degree Q according to an embodiment of the present invention. FIG. 4 is a diagram showing a ranking of a contribution rate C of each feature F to an abnormality degree Q according to an embodiment of the present invention. FIG. 5 is a diagram of an exemplary cause-and-effect matrix T according to an embodiment of the present invention. FIG. 6 is a diagram of an exemplary identification result R of an abnormality cause according to an embodiment of the present invention.

As shown in FIG. 2, the facility condition monitoring device 1 includes an abnormality-degree-calculation-model construction part 2, an abnormality degree calculation part 3, an abnormality determination part 4, an abnormality-contribution-rate calculation part 5, and an abnormality cause identification part 6. The facility condition monitoring device 1 comprises a computer, for instance, including a CPU (processor, not shown), a storage device m such as a memory, including ROM and RAM, and an external storage device, and a communication interface. The CPU operates (e.g. computation of data) in accordance with instructions of program (facility condition monitoring program) loaded to a main storage device, and thereby the above functional parts are embodied. Each functional part of the facility condition monitoring device 1 will now be described.

The abnormality-degree-calculation-model construction part 2 constructs an abnormality degree calculation model M for calculating an abnormality degree Q of a monitoring feature group Ft consisting of a plurality of features F extracted from the state-quantity fluctuation data D (monitoring target state-quantity fluctuation data) of the monitoring target facility 9 in a monitoring state, based on a normal feature group Fe consisting of a plurality of features F extracted from the state-quantity fluctuation data D (normal state-quantity fluctuation data) of the monitoring target facility 9 in a normal state. The normal state of the monitoring target facility 9 means that the normality of the monitoring target facility 9 is ensured in some way. The normal state-quantity fluctuation data is data measured on the monitoring target facility 9 in such a normal state. Meanwhile, the monitoring state of the monitoring target facility 9 means that the normality of the monitoring target facility 9 is not ensured. The monitoring target state-quantity fluctuation data is data measured on the monitoring target facility 9 in such a monitoring state.

The features F (normal feature group Fe and monitoring feature group Ft) respectively extracted from the state-quantity fluctuation data D of the monitoring target facility 9 in a normal state or an abnormal state are each extracted by primary processing using a predetermined technique (algorithm). As the kind of the features F, there may be mentioned root mean square value (RMS), kurtosis, skewness, crest factor, difference between maximum and minimum peaks, clearance factor, impulse indicator, statistic based on envelope analysis, FLAC, vibration amplitude (overall), feature F obtained by frequency analysis (frequency spectrum) such as one-third octave band spectrum, and information obtained by processing with SFI filter. The SFI filter is a band-pass filter which automatically extracts an impulse waveform in accordance with a skewness of a time-frequency spectrum. These features F can be obtained from the same state-quantity fluctuation data D.

The normal feature group Fe and the monitoring feature group Ft each contain at least two features F of these various kinds of features F. In the present embodiment, the normal feature group Fe and the monitoring feature group Ft contain the same kind of features F. However, the present invention is not limited to the present embodiment. In some embodiments, the normal feature group Fe and the monitoring feature group Ft may not contain the same kind of features F. The features F contained in one group may partially differ from the other; for instance, the monitoring feature group Ft may not contain a feature with a small contribution rate C, described later.

In some embodiments, the abnormality degree calculation model M constructed based on the normal feature group Fe may be a map model, in which the normal feature group Fe is mapped into a normal subspace, created through principal component analysis. By calculating the degree of deviance such as a distance between the normal subspace and a mapping point of the monitoring feature group Ft in this map model as an abnormality degree Q, it is possible to determine whether it is normal or abnormal based on the abnormality degree Q. More specifically, principal component analysis is performed on a plurality of normal feature groups Fe extracted from a plurality of normal state-quantity fluctuation data measured at different times, and the abnormality degree calculation model M (eigenvector matrix) is determined by which a plurality of features F are mapped into a mapping space defined in a spatial range corresponding to k number of principal components $u_k$ less than the number of the features F. Here, a subspace of the mapping space into which the normal feature group Fe is mapped is referred to as the normal subspace. The principal component $u_k$ obtained by the principal component analysis is defined as a linear combination having each of the features F as a variate. That is, let $F_i$ be i-th feature F and $a_i$ be i-th coefficient, the principal component $u_k$ is expressed by: $u_k = \Sigma a_i \cdot F_i$ where i is an integer of 2 or more; k is an integer of 1 or more ($i \geq 2$, $k \geq 1$). Then, coefficient at which gives the maximum variance of the principal component $u_k$ is determined with respect to the analysis target sample. In this way, an eigenvector matrix with the determined coefficient $a_i$ is obtained.

In some embodiments, the abnormality degree calculation model M constructed based on the normal feature group Fe may be a MD calculation model which can determine a Mahalanobis distance (MD) in the Mahalanobis-Taguchi method (MT method). By calculating a MD value of the monitoring feature group Ft in this MD calculation model as an abnormality degree Q, it is possible to determine whether it is normal or abnormal based on the abnormality degree Q. In the MT method, as commonly known, a unit space which is a set of normal data (a plurality of normal feature groups Fe) is defined, and a Mahalanobis distance is calculated using an inversion matrix of a correlation matrix of the unit space. This Mahalanobis distance is a parameter taking into consideration a correlation between the features F constituting the unit space, and a large Mahalanobis distance indicates a deviance from the population, namely, the set of normal data. In this case, it can be determined that some feature F is altered under influences of a possible abnormality, and thus it can be diagnosed that an abnormality is present in the monitoring target facility 9. That is, the MD calculation model is constructed using the inversion matrix of the correlation matrix of the above unit space.

The abnormality degree calculation part 3 acquires the monitoring feature group Ft and calculates the abnormality degree Q of the monitoring feature group Ft using the above-described abnormality degree calculation model M constructed by the abnormality-degree-calculation-model construction part 2. That is, in a case where the abnormality degree calculation model M is the above-described map model, a mapping point of the monitoring feature group Ft is determined by the map model, and then the degree of deviance of the mapping point from the normal subspace is determined to calculate the abnormality degree Q (abnormality degree Q=deviance degree from normal subspace). In a case where the abnormality degree calculation model M is the above-described MD calculation model, the abnormality degree Q is calculated by determining the MD value of the monitoring feature group Ft by the MD calculation model (abnormality degree Q=MD value). In the embodiment shown in FIG. 2, the abnormality degree calculation part 3 is configured such that once the monitoring feature group Ft is acquired, its abnormality degree Q is calculated.

The abnormality determination part 4 determines whether an abnormality is present in the monitoring target facility 9, based on the abnormality degree Q calculated by the abnormality degree calculation part 3. Specifically, the presence of abnormality may be determined based on a comparison between the abnormality degree Q and an abnormality determination threshold L, for instance, it may be determined as normal (no abnormality is present) if the abnormality degree Q is equal to or less than the abnormality determination threshold L, whereas it may be determined as abnormal (an abnormality is present) if the abnormality degree Q is more than the abnormality determination threshold L. In the embodiment shown in FIG. 2, the abnormality determination part 4 compares the abnormality degree Q with the abnormality determination threshold L as often as the abnormality degree Q calculated by the abnormality degree calculation part is input. For instance, in the example shown in FIG. 3, the abnormality determination part 4 determines that an abnormality is present at times t1 and t2 in FIG. 3 as the abnormality degree Q exceeds the abnormality determination threshold L.

The abnormality-contribution-rate calculation part 5 estimates a contribution rate C of each of the features F constituting the monitoring feature group Ft used for calculating the abnormality degree Q determined as abnormal by the determination part 4, with respect to the abnormality degree Q. This contribution rate C is an index indicating to what extent each of the features F contributes to, for instance, the change of the abnormality degree Q to exceed the abnormality determination threshold L. A feature F having a higher contribution rate C with respect to the abnormality degree Q corresponds to a main factor of determining an abnormality. Further, a feature F having a higher contribution rate C with respect to the abnormality degree Q is regards as highly sensitive to the detected abnormality and strongly associated with the abnormality cause.

In an embodiment where the abnormality degree Q is calculated by the principal component analysis, for instance, the contribution rate C may be coefficient $a_i$ (principal component loading) in the above principal component equation. Meanwhile in a case where the abnormality degree Q is MD, a signal-to-noise ratio obtained using an orthogonal array may be calculated as the contribution rate C. The larger the absolute value of the coefficient $a_i$ or the signal-to-noise ratio, the higher the contribution rate C. FIG. 4 shows an example in which contribution rates C of the individual features F with respect to the abnormality degree Q at time t1 in FIG. 3 are determined, and the contribution rates C are arranged in descending order.

The abnormality cause identification part 6 identifies an abnormality cause, based on the contribution rate C of each feature F with respect to the abnormality degree Q as well as a cause-and-effect matrix T (FIG. 5) which represents a relationship between the abnormality cause (failure mode, the same shall apply hereinafter) of the monitoring target facility 9 and the features F. That is, the cause-and-effect matrix T in the present invention represents a relationship between the abnormality cause and the features F. In the embodiment shown in FIG. 5, the cause-and-effect matrix T is a two-dimensional matrix with abnormality causes arranged in rows and features F arranged in columns, and at least one feature F is extracted by each technique for extracting features F. A relationship between the abnormality cause and the feature F is shown in a place (cell) where the abnormality cause (row) and each feature F ($F_1$, $F_2$, . . . in FIG. 5) (column) intersect, and a score (e.g., Y or N in FIG. 5, blank means no influence or unknown) is described therein, in accordance with the degree of influence of each abnormality cause. In the cause-and-effect matrix T, a score which reflects the degree of influence of the respective abnormality cause is determined for each feature. In addition, the above score is determined based on an experience value.

The abnormality cause identification part 6 calculates the score for each abnormality cause by collating features F having top N contribution rates C which largely contribute to the abnormality degree Q obtained by the abnormality-contribution-rate calculation part 5, with the cause-and-effect matrix T (see FIG. 6). If the abnormality cause has a high score, a possibility that this abnormality cause accounts for the detected abnormality is high. The abnormality cause is thus identified by this score. Here, N is a number of 1 or more and less than the total number of the features F used for calculating the abnormality degree Q.

Then, an identification result R (diagnosis result) of the abnormality cause by the abnormality cause identification part 6 is reported (provided) to an operator. The identification result R of the abnormality cause may include top Na (1≤Na<N) abnormality causes identified by the abnormality cause identification part 6. Additionally, the identification result R of the abnormality cause may include the above scores corresponding to the top Na abnormality causes as information indicating which feature F is a cause or a very likely cause of the detected abnormality. Instead of the scores, the identification result R of the abnormality cause may include the probability of the abnormality cause that can be calculated based on the contribution rate C. In the example in FIG. 6, a relationship between the abnormality cause and its probability (FIG. 6) is displayed on a screen of a display device 16 such as a display to present the diagnosis result to the user. Thus, the operator can confirm the identification result R of the abnormality cause by checking the display device 16.

With reference to the embodiment shown in FIG. 2, the abnormality-degree-calculation-model construction part 2 is configured to store the abnormality degree calculation model M in the storage device m. The abnormality degree calculation part 3 is connected to the abnormality determination part 4 and input the abnormality degree Q calculated using the abnormality degree calculation model M stored in the storage device m into the abnormality determination part 4.

Once the abnormality determination part 4 acquires the input abnormality degree Q, it is determined whether an abnormality is present based on the abnormality degree Q, and if it is determined that an abnormality is present, this fact is input to the abnormality-contribution-rate calculation part 5. The abnormality-contribution-rate calculation part 5, receiving the abnormality identification result, calculates the above-described contribution rate C by, for instance, referring to the abnormality degree Q or the abnormality degree calculation model M. Thereafter, the abnormality cause identification part 6 outputs the identification result R of the abnormality cause to the display device 16, using the cause-and-effect matrix T.

With the above configuration, an abnormality (abnormality sign) of the monitoring target facility 9 is determined based on the abnormality degree Q calculated based on the abnormality degree calculation model M constructed based on the normal feature group Fe (multivariate data). Furthermore, using the cause-and-effect matrix T which represents a relationship between the abnormality cause of the monitoring target facility 9 and the contribution rate C of each of the features F with respect to the abnormality degree Q, the cause of an abnormality occurring in the monitoring target facility 9 is identified based on the contribution rates C of the features F, with respect to the abnormality degree, constituting the monitoring feature group Ft used for calculating the abnormality degree Q if it is determined that an abnormality is present. In this way, the cause-and-effect matrix T is made with a relationship between the abnormality cause and the contribution rate C of the features F with respect to the abnormality degree Q, and the abnormality cause is identified, using this cause-and-effect matrix T, based on the contribution rate C of each of the features F with respect to the abnormality degree Q when an abnormality is determined, which makes it possible to precisely identify the abnormality cause.

In some embodiments, as shown in FIG. 2, the facility condition monitoring device 1 may further include a state-quantity-fluctuation-data acquisition part 11 configured to acquire the state-quantity fluctuation data D and a feature extraction part 12 configured to extract the features F from the state-quantity fluctuation data D acquired by the state-quantity-fluctuation-data acquisition part 11. In the embodiment shown in FIG. 2, the feature extraction part 12 is connected to the state-quantity-fluctuation-data acquisition part 11 so that the state-quantity fluctuation data D is acquired from the state-quantity-fluctuation-data acquisition part 11. The state-quantity-fluctuation-data acquisition part 11 is configured such that the measurement data is input from the sensors 8 disposed in the monitoring target facility 9 alone or together with the time data, and the state-quantity fluctuation data D is obtained when a predetermined number or a predetermined period of measurement data are input thereto. The transfer of the state-quantity fluctuation data D from the state-quantity-fluctuation-data acquisition part 11 to the feature extraction part 12 may be performed via the storage device m. Specifically, the state-quantity-fluctuation-data acquisition part 11 may be configured to store the acquired state-quantity fluctuation data D in the storage device m, while the feature extraction part 12 may be configured to acquire the state-quantity fluctuation data D from the storage device m.

Additionally, the feature extraction part 12 is connected to the abnormality-degree-calculation-model construction part 2 and with the abnormality degree calculation part 3 so as to input the normal feature group Fe to the abnormality-degree-calculation-model construction part 2 and input the monitoring feature group Ft to the abnormality degree calculation part 3. For instance, the feature extraction part 12 may be configured such that, through switching between learning mode and monitoring mode in response to an operation of a user, a plurality of extracted features F is input to the abnormality-degree-calculation-model construction part 2 in the learning mode whereas a plurality of extracted features F is input to the abnormality degree calculation part 3 in the monitoring mode.

With the above configuration, the facility condition monitoring device 1 has function parts for extracting a plurality of features F from the acquired state-quantity fluctuation data D, and thereby it is possible to construct the abnormality degree calculation model M and monitor an abnormality in real time.

However, the present invention is not limited to the present embodiment. In some embodiments, the facility condition monitoring device 1 may not include the state-quantity-fluctuation-data acquisition part 11 and the feature extraction part 12, and may be configured such that a plurality of features F are input from other system (apparatus). That is, it may be configured such that a plurality of features F extracted by other apparatus are input to the abnormality-degree-calculation-model construction part 2 and the abnormality degree calculation part 3.

In some embodiments, the features F include technique-specific features F extracted by adopting a plurality of different techniques to the state-quantity fluctuation data D. That is, using two or more techniques (algorithms) for extracting the features F as describe above, technique-specific features F are extracted from the same state-quantity fluctuation data D. In this regard, one or more kind of the features F may be extracted by each technique.

With the above configuration, the features F are extracted by respectively adopting a plurality of techniques to the state-quantity fluctuation data D, and thereby it is possible to multilaterally monitor an abnormality of the monitoring target facility 9.

In some embodiments, the above-described state-quantity fluctuation data D contains a time-dependent change of the state quantity in a transient period during which the rotational speed of the monitoring target facility 9 is changed from a first value to a second value. In a case where the monitoring target facility 9 is a wind turbine power generating apparatus, this transient period may be from a startup time at which the rotational speed is 0 (first value) to a time at which the rotational speed reaches a rated speed (second value).

In a case where the monitoring target facility 9 is a wind turbine power generating apparatus, for instance, the rotational speed is changed from 0 (first value) to a rated speed (second value) at the start up time. Under an operation condition in such a transient period, some abnormal phenomenon is likely detected, unlike in a steady operation period where the rotational speed is kept at the second value. More specifically, it is observed that the amplitude of the features in response to the change in rotational speed is increased in accordance with the stage of damage, namely, with the progress of damage.

With the above configuration, the abnormality diagnosis can be performed based on the state-quantity fluctuation data D in the operation transient period such as the start up time of the monitoring target facility 9, and thereby it is possible to more reliably detect an abnormality caused in the monitoring target facility 9.

Figure 7:
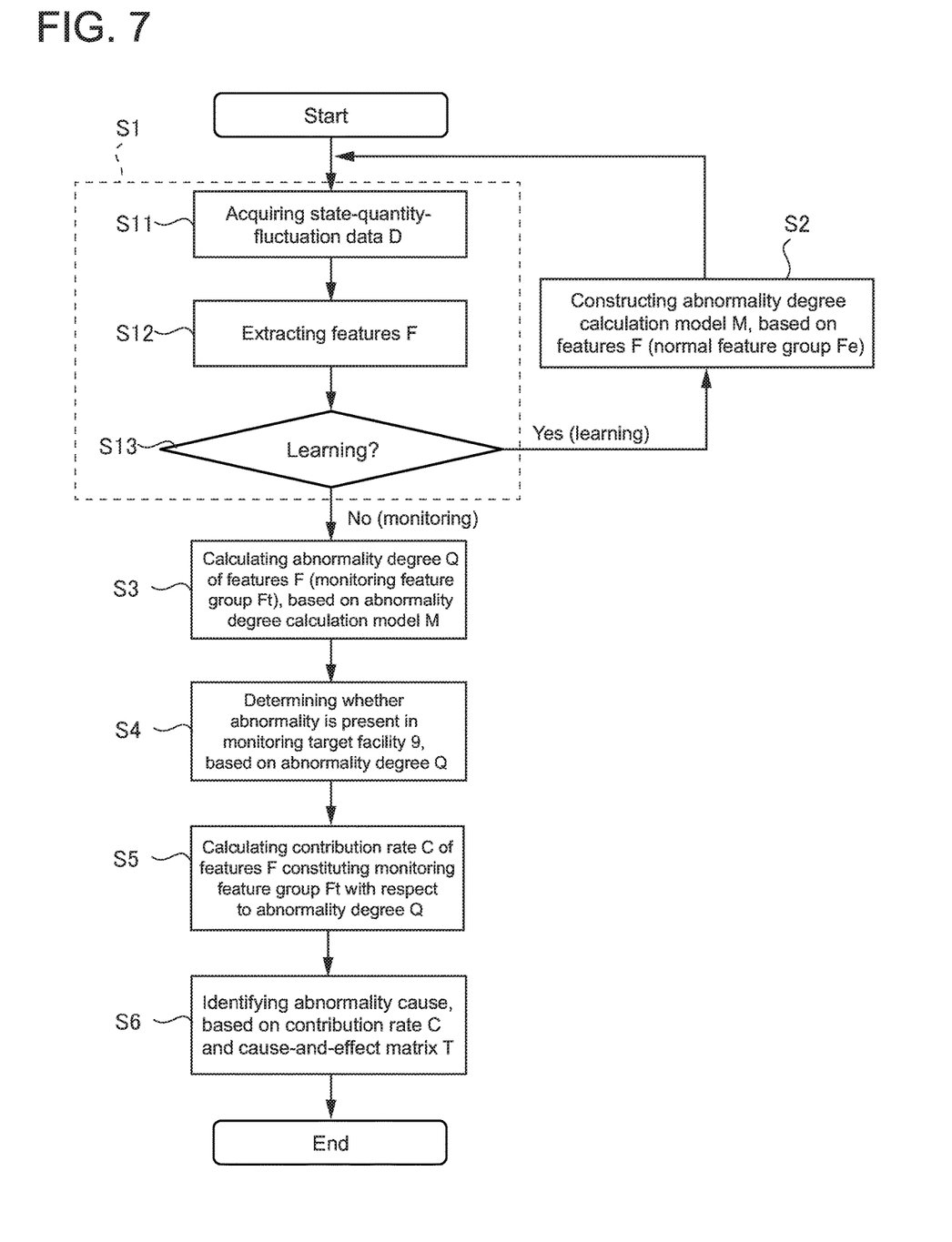
FIG. 7 is a diagram showing a facility condition monitoring method according to an embodiment of the present invention.

Hereinafter, a facility condition monitoring method corresponding to a process implemented by the above-described facility condition monitoring device 1 will be described with reference to FIG. 7. FIG. 7 is a diagram showing a facility condition monitoring method according to an embodiment of the present invention.

The facility condition monitoring method is to diagnose an abnormality of a monitoring target facility 9 including a rotating machine or a reciprocating machine, based on state-quantity fluctuation data D representative of a time-dependent change of a state quantity measured on the monitoring target facility 9. As shown in FIG. 7, the facility condition monitoring method includes a feature acquisition step (S1), an abnormality-degree-calculation-model construction step (S2), an abnormality degree calculation step (S3), an abnormality determination step (S4), an abnormality-contribution-rate calculation step (S5), and an abnormality cause identification step (S6). In the embodiment shown in FIG. 7, the feature acquisition step (S1) includes a state-quantity-fluctuation-data acquisition step (S11) and a feature extraction step (S12). The facility condition monitoring method may be implemented by the above-described facility condition monitoring device 1, or may be implemented by hand while acquiring measurement data measured with the sensors 8 on the monitoring target facility 9 such as a wind turbine power generating apparatus and using a computer.

The facility condition monitoring method will be described in order of steps of FIG. 7.

In step S1 of FIG. 7, the feature acquisition step is performed. The feature acquisition step (S1) is a step of acquiring a plurality of features F, as already explained, extracted from the above-described state-quantity fluctuation data D. In the embodiment shown in FIG. 7, the feature acquisition step includes a state-quantity-fluctuation-data acquisition step (S11) of acquiring the state-quantity fluctuation data D and a feature extraction step (S12) of extracting a plurality of features F from the state-quantity fluctuation data D acquired by the state-quantity-fluctuation-data acquisition step. Details of the state-quantity-fluctuation-data acquisition step (S11) and the feature extraction step (S12) are omitted as they are the same as the process details implemented by the state-quantity-fluctuation-data acquisition part 11 and the feature extraction part 12 as already described, respectively. However, the present invention is not limited to the present embodiment. In some embodiments, the feature acquisition step may be to directly acquire a plurality of features F which has been already extracted from the state-quantity fluctuation data D.

In step S2 of FIG. 7, the abnormality-degree-calculation-model construction step is performed. The abnormality-degree-calculation-model construction step (S2) is a step of constructing an abnormality degree calculation model M for calculating an abnormality degree Q of a monitoring feature group Ft consisting of a plurality of features F extracted from the state-quantity fluctuation data D (monitoring target state-quantity fluctuation data) of the monitoring target facility 9 in a monitoring state, based on a normal feature group Fe (described above) consisting of a plurality of features F extracted from the state-quantity fluctuation data D (normal state-quantity fluctuation data) of the monitoring target facility 9 in a normal state. A detail of the abnormality-degree-calculation-model construction step (S2) is omitted as it is the same as the process detail implemented by the abnormality-degree-calculation-model construction part 2 as already described.

In the embodiment shown in FIG. 7, the abnormality-degree-calculation-model construction step (S2) is performed if the monitoring target facility 9 is in a normal state in step S13. The construction of the abnormality degree calculation model M in the abnormality-degree-calculation-model construction step (S2) is performed after acquisition of a plurality of normal feature groups Fe by repeating steps S11 to S12 multiple times, for instance. Conversely, if the monitoring target facility 9 is not in a normal state in step S13, i.e. if the monitoring target facility 9 is in a monitoring state, the following steps S3 to S6 are performed.

In step S3, the abnormality degree calculation step is performed. The abnormality degree calculation step (S3) is a step of calculating the abnormality degree Q of the monitoring feature group Ft using the above-described abnormality degree calculation model M constructed by the abnormality-degree-calculation-model construction part 2. A detail of the abnormality degree calculation step (S3) is omitted as it is the same as the process detail implemented by the abnormality degree calculation part 3 as already described.

In step S4, the abnormality determination step is performed. The abnormality determination step (S4) is a step of determining whether an abnormality is present in the monitoring target facility 9, based on the abnormality degree Q calculated by the abnormality degree calculation step (S3). A detail of the abnormality determination step (S4) is omitted as it is the same as the process detail implemented by the abnormality determination part 4 as already described.

In step S5, the abnormality-contribution-rate calculation step is performed. The abnormality-contribution-rate calculation step (S5) is a step of obtaining a contribution rate C of each of the features F constituting the monitoring feature group Ft used for calculating the abnormality degree Q, if it is determined in the abnormality determination step (S4) that an abnormality is present, with respect to the abnormality degree Q. A detail of the abnormality-contribution-rate calculation step (S5) is omitted as it is the same as the process detail implemented by the abnormality-contribution-rate calculation part 5 as already described.

In step S6, the abnormality cause identification step is performed. The abnormality cause identification step (S6) is a step of identifying an abnormality cause, based on the contribution rate C of each feature F with respect to the abnormality degree Q calculated by the above-described abnormality-contribution-rate calculation step (S5) as well as a cause-and-effect matrix (FIG. 5) which represents a relationship between the abnormality cause of the monitoring target facility 9 and the plurality of features F. A detail of the abnormality cause identification step (S6) is omitted as it is the same as the process detail implemented by the abnormality cause identification part 6 as already described.

Embodiments of the present invention were described in detail above, but the present invention is not limited thereto, and various amendments and modifications may be implemented.

Moreover, while in the above embodiments, the principal component analysis or the MT method is used to detect the abnormality degree and determine the contribution rate thereof, the present invention is not limited thereto. Any other method for calculating the abnormality degree from multivariate data can be applied.

The invention claimed is:

1. A facility condition monitoring device for diagnosing an abnormality of a monitoring target facility including a rotating machine or a reciprocating machine, based on state-quantity fluctuation data representative of a time-dependent change of a state quantity measured on the monitoring target facility, the facility condition monitoring device comprising:
an abnormality-degree-calculation-model construction part configured to construct an abnormality degree calculation model for calculating an abnormality degree of a monitoring feature group consisting of a plurality of features extracted from the state-quantity fluctuation data of the monitoring target facility in a monitoring state, based on a normal feature group consisting of a plurality of features extracted from the state-quantity fluctuation data of the monitoring target facility in a normal state, the state-quantity fluctuation data comprising a time-dependent change of the state quantity in a transient period during which a rotational speed of the monitoring target facility is changed from a first value to a second value;
an abnormality degree calculation part configured to calculate the abnormality degree of the monitoring feature group with the abnormality degree calculation model;
an abnormality determination part configured to determine whether an abnormality is present in the monitoring target facility, based on the abnormality degree;
an abnormality-contribution-rate calculation part configured to obtain a contribution rate of each of the plurality of features constituting the monitoring feature group used for calculating the abnormality degree if it is determined by the abnormality determination part that an abnormality is present; and
an abnormality cause identification part configured to identify an abnormality cause of the monitoring target facility, based on the contribution rate and a cause-and-effect matrix which represents a relationship between the abnormality cause and the plurality of features.

2. The facility condition monitoring device according to claim 1,
wherein the plurality of features comprise technique-specific features extracted by adopting a plurality of different techniques to the state-quantity fluctuation data.

3. The facility condition monitoring device according to claim 1, further comprising:
a state-quantity-fluctuation-data acquisition part configured to acquire the state-quantity fluctuation data; and
a feature extraction part configured to extract the plurality of features from the state-quantity fluctuation data.

4. The facility condition monitoring device according to claim 1,
wherein the plurality of features comprise features extracted by a band-pass filter which automatically extracts an impulse waveform from a skewness of a time-frequency spectrum.

5. The facility condition monitoring device according to claim 1,
wherein the state quantity is a vibration of the monitoring target facility, a strain, a torque during a rotational movement or a reciprocating movement, a rotational speed, or when the monitoring target facility is a power generating apparatus, a voltage or a current.

6. The facility condition monitoring device according to claim 1,
wherein the monitoring target facility is a wind turbine power generating apparatus.

7. A facility condition monitoring method for diagnosing an abnormality of a monitoring target facility including a rotating machine or a reciprocating machine, based on state-quantity fluctuation data representative of a time-dependent change of a state quantity measured on the monitoring target facility, the facility condition monitoring method comprising:
- an abnormality-degree-calculation-model construction step of constructing an abnormality degree calculation model for calculating an abnormality degree of a monitoring feature group consisting of a plurality of features extracted from the state-quantity fluctuation data of the monitoring target facility in a monitoring state, based on a normal feature group consisting of a plurality of features extracted from the state-quantity fluctuation data of the monitoring target facility in a normal state, the state-quantity fluctuation data comprising a time-dependent change of the state quantity in a transient period during which a rotational speed of the monitoring target facility is changed from a first value to a second value;
- an abnormality degree calculation step of calculating the abnormality degree of the monitoring feature group with the abnormality degree calculation model;
- an abnormality determination step of determining whether an abnormality is present in the monitoring target facility, based on the abnormality degree;
- an abnormality-contribution-rate calculation step of obtaining a contribution rate of each of the plurality of features constituting the monitoring feature group used for calculating the abnormality degree if it is determined in the abnormality determination step that an abnormality is present; and
- an abnormality cause identification step of identifying an abnormality cause of the monitoring target facility, based on the contribution rate and a cause-and-effect matrix which represents a relationship between the abnormality cause and the plurality of features.

* * * * *